United States Patent [19]

VanderPol et al.

[11] Patent Number: 4,872,249
[45] Date of Patent: Oct. 10, 1989

[54] TOOL SUPPORT AND GUIDE SYSTEM FOR REPAIR OF BOILER TUBE PANELS AND PROCESS FOR CARRYING OUT REPAIR USING SAME

[75] Inventors: Jerald VanderPol, Eldorado Hills; Cory J. Silber, Sacramento; William H. Astle, Rancho Cordova, all of Calif.

[73] Assignee: Tri Tool Inc., Rancho Cordova, Calif.

[21] Appl. No.: 225,174

[22] Filed: Jul. 28, 1988

[51] Int. Cl.⁴ ............................................. B23P 15/26
[52] U.S. Cl. .............................. 29/157.4; 29/157.3 R; 83/745; 83/485; 83/574
[58] Field of Search ........ 29/157.4, 157.3 R, 157.3 C, 29/402.11; 83/745, 485, 574, 56

[56] References Cited

U.S. PATENT DOCUMENTS

| | | |
|---|---|---|
| 2,973,576 | 3/1961 | Hentke . |
| 3,254,455 | 6/1966 | Hensley . |
| 4,181,054 | 1/1980 | Striebig ................................. 83/153 |
| 4,329,769 | 5/1982 | Glatthorn ........................... 29/157.4 |
| 4,633,555 | 1/1987 | Legge ................................. 29/157.4 |
| 4,739,688 | 4/1988 | Brennan et al. .................... 29/157.4 |

OTHER PUBLICATIONS

Esco Tool Advertisement, Power Engineering, Jun. 1988, p. 83.

Primary Examiner—P. W. Echols
Assistant Examiner—R. Jordan
Attorney, Agent, or Firm—Bacon & Thomas

[57] ABSTRACT

A tool support and guide assembly for use in repairing boiler tube panels includes a support carriage mountable upon a guide rail that has been previously installed to enable a panel saw tool to be guided along a straight cut line. The support carriage includes a second guide rail conforming in configuration to the first installed guide rail and which extends perpendicularly to the first rail towards the line of cut tube ends. A similar or the same panel saw is mounted on a carriage that is roller guided along the second rail for cutting the membrane between the tubes of the tube panel. A tube end preparation tool is also roller guided along the second guide rail to enable its positioning above each of the cut tube ends so that each tube can be machined (i.e., beveled) in preparation for welding thereto of a replacement tube panel. The perpendicular rails provide a simple guide assembly for accurately locating the saw and the tube end preparation tool. Both rails conform in configuration for receiving identical sets of guide rollers so the panel saw can be interchangeably used with either rail.

9 Claims, 6 Drawing Sheets

TOOL SUPPORT AND GUIDE SYSTEM FOR REPAIR OF BOILER TUBE PANELS AND PROCESS FOR CARRYING OUT REPAIR USING SAME

BACKGROUND OF THE INVENTION

This invention relates to a tool support and guide system for effecting rapid end preparation of tube ends of boiler tube panels and, more particularly, to a tool system for preparing ends of tubes adjacent a removed boiler tube panel section to enable a replacement panel section to be installed by welding, including a method of using the tool system.

The tube panels with which the tool system of the present invention is used are found, for example, in electrical power generating plants and in steam generating boilers found therein. However, the invention has application in any type of heat exchanger system using tube panels of this type.

The tube panels of concern are generally found arranged in vertical or inclined walls and include metal tubes joined together by metal membranes or webbing welded to adjacent tubes or by comparable narrow metal interconnecting strips. The tubes are customarily made of steel and are subject to corrosion in the generation of steam therein as they provide a continuous fluid circuit within the boiler. Because of their massive size, it has become accepted practice to remove rectangular sections of tube panels when tubes in a given area become damaged or ruptured and to insert as by welding a replacement section of panel. To replace an entire panel or wall section would be too disruptive to the operation of the power generating station and much too costly in actual practice.

Accordingly, some of the early attempts to deal with this problem involved the use of hand held tools or cutting torches to cut rectangular sections from the tube wall which included the damaged portions. This was a lengthy, inefficient process, and it was soon found that the dimensions of the removed panel section had to be more precise than could be obtained from hand held tools in order for the replacement section to be fitted properly, without extensive labor.

Thus, it became evident that guide means would be required to guide the cutting operation and to remove sections whose dimensions were known very precisely so that a replacement section could be prefabricated and reinserted in a short period of time.

One such apparatus for replacing damaged tube sections is disclosed in U.S. Pat. No. 4,633,555 issued on Jan. 6, 1987 to Legge. In this device, a saw is mounted on a guide means for slidable movement thereon. With the aid of this guide it is possible to cut a straight line through the tubes that are parallel to the guide at a predetermined distance from the guide. By repositioning the guide on the tube wall, it is possible to cut and remove a rectangular panel section with straight cut lines.

This patent also discloses an end preparation tool (termed an "end prep" tool in the trade) mountable on the guide for movement therealong so the end prep tool can be located adjacent the end of each cut off tube for machining a precise bevel thereon in preparation for welding of a replacement tube panel in the removed section.

The system according to the above-mentioned U.S. Pat. No. 4,633,555 does not provide a means for cutting the webs between the tubes of the tube panels and moreover is specifically designed to enable this saw to slide along the guide during the cutting procedure.

Another system for cutting out damaged panel tube sections is disclosed in U.S. patent application Ser. No. 213,939, filed June 30, 1988 naming W. H. Astle as inventor and entitled, "Panel Saw Apparatus" and assigned in common with the present invention. The aforementoned patent application is incorporated herein by reference and describes a panel saw adapted to be guided by a rail means temporarily attached to a tube panel whereby a straight line cut through the panel can be carried out by a series of plunge cuts through the tubes of the panel while the saw is braked relative to the guide rails during each cut.

It has been observed that it would be highly desirable to provide a single adapter system usable with the temporarily installed guide rail described in the aforementioned U.S. patent application Ser. No. 213,939 that would enable mounting of a membrane cutting saw as well as an end prep tool so that, without removing the guide rail, the membranes between the tubes of the panel could be severed and then, with a minimum of tool changeover, the ends of the tubes could be prepared as by bevelling for installation of the replacement tube panel.

SUMMARY OF THE INVENTION

In accordance with the present invention, a tool support and guide system is provided to cooperate with a previously installed guide rail system that was previously used to cut a straight line through a tube panel by a series of plunge cuts made by a panel saw in such a manner that the membranes can be cut between tubes and the tube ends prepped, all using the same original guide rail.

The tool system in accordance with the present invention mounts on the previously installed guide rail and includes an assembly that permits the mounting of the same panel saw and its support carriage on a second rail disposed perpendicular to the first rail and supported by a roller arrangement that permits the tool system to travel along the initial guide rail.

The second guide rail conforms precisely to the first guide rail so that the same panel saw system can be guided along the second rail in a direction extending perpendicular to the first rail and perpendicular to the tubes of the tube panel. Since the same saw is used as is used to cut the tubes initially, the brake system provided as part of the panel saw system is available when the saw is used in the perpendicular direction to cut the webbing or membranes between the tubes before end prepping the tubes.

Following cutting up the membranes between the tubes, the panel saw is simply removed from the second guide rail and an end preparation tool is mounted on the second rail in its place. The end preparation tool is then guided by perpendicular movements along the two guide rails until it is located adjacent a tube end to be prepped, whereupon the end preparation is carried out. Thus, the tool system enables both the panel saw and the end prep tool to be precisely placed manually at locations enabling each tool to carry out its operation in an efficient and precise manner.

Accordingly, the tool system in accordance with the present invention includes a first guide rail secured along the tube panel; a supporting member including guide rollers for engaging the first guide rail and movable therealong when so engaged; a second guide rail orthogonally disposed with respect to the first guide rail and extending towards the previously cut ends of the tube panel, the first and second guide rails conforming in configuration so as to enable engagement thereof by identical sets of guide rollers and support structure for tools used to cut and prepare the ends of tubes constituting the tube panel.

The invention also contemplates the process of preparing the end areas of tubes of tube panels having a section removed therefrom and which have been previously cut by means of a saw mounted by guide rollers by movement along a first rail during the panel section removal operation, including the mounting of a second guide rail extending perpendicular to the first guide rail adjacent the cut tube ends and the mounting of an identical cutting saw on the second rail; using the saw to cut the membranes between the tubes to a predetermined depth by supporting the saw by means of the first and second guide rails; and then end prepping each tube end by locating an end preparation tool on the second guide rail using a carriage having a guide roller system for engaging the second rail.

BRIEF DESCRIPTION OF THE DRAWINGS

The above objectives of the present invention along with additional advantages and features will be readily apparent from a consideration of the following description of the preferred embodiment and by reference to the drawings in which.

DESCRIPTION OF THE PREFERRED EMBODIMENT

Figure 1:
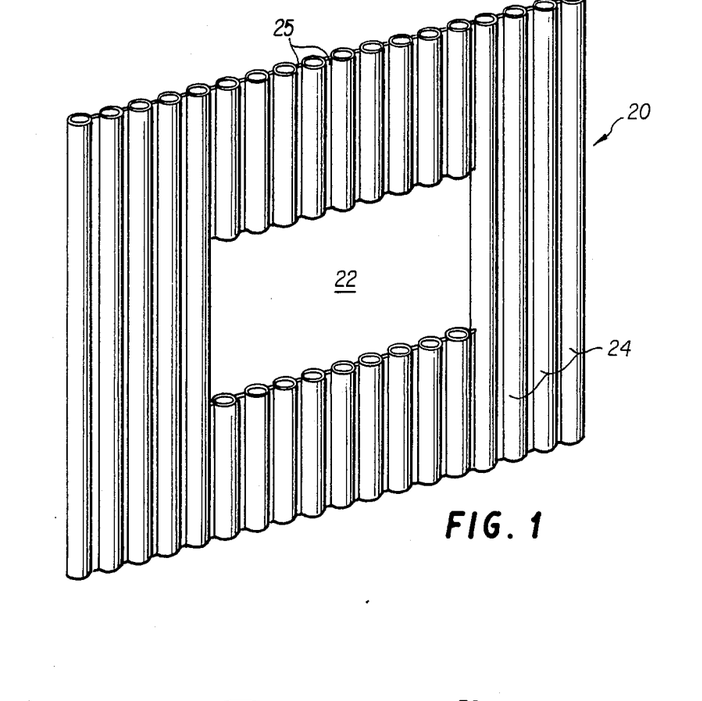
FIG. 1 is a perspective view illustrating a tube wall or, a heat exchanger panel, from which a panel section of tubular pipe has been removed.
Figure 2:
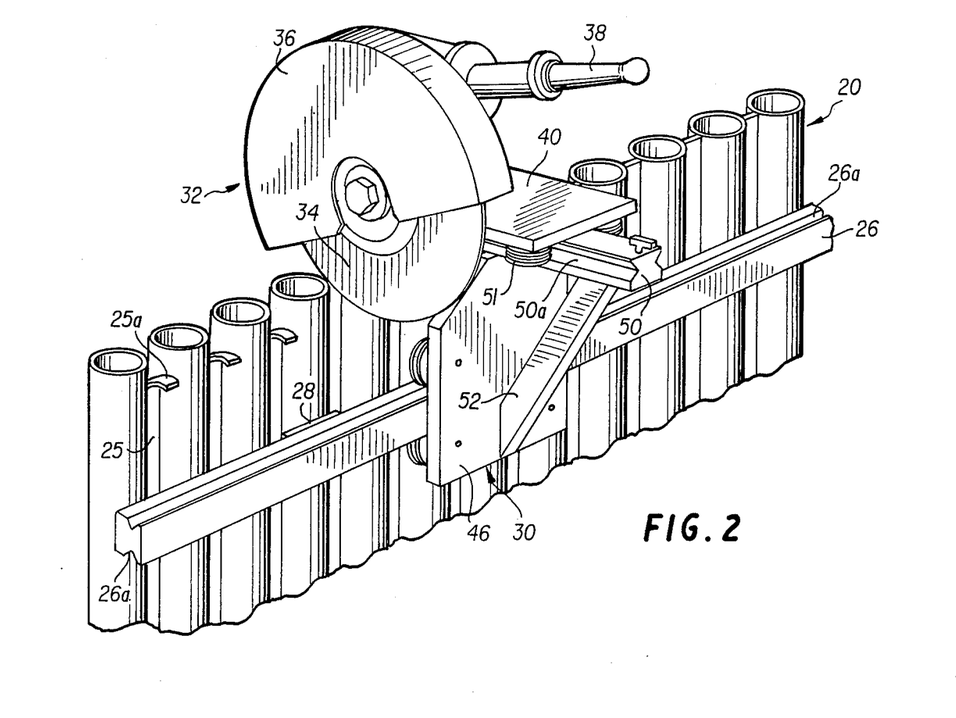
FIG. 2 is a perspective view of a saw assembly mounted on the tool support and guide system of the present invention.
Figure 3:
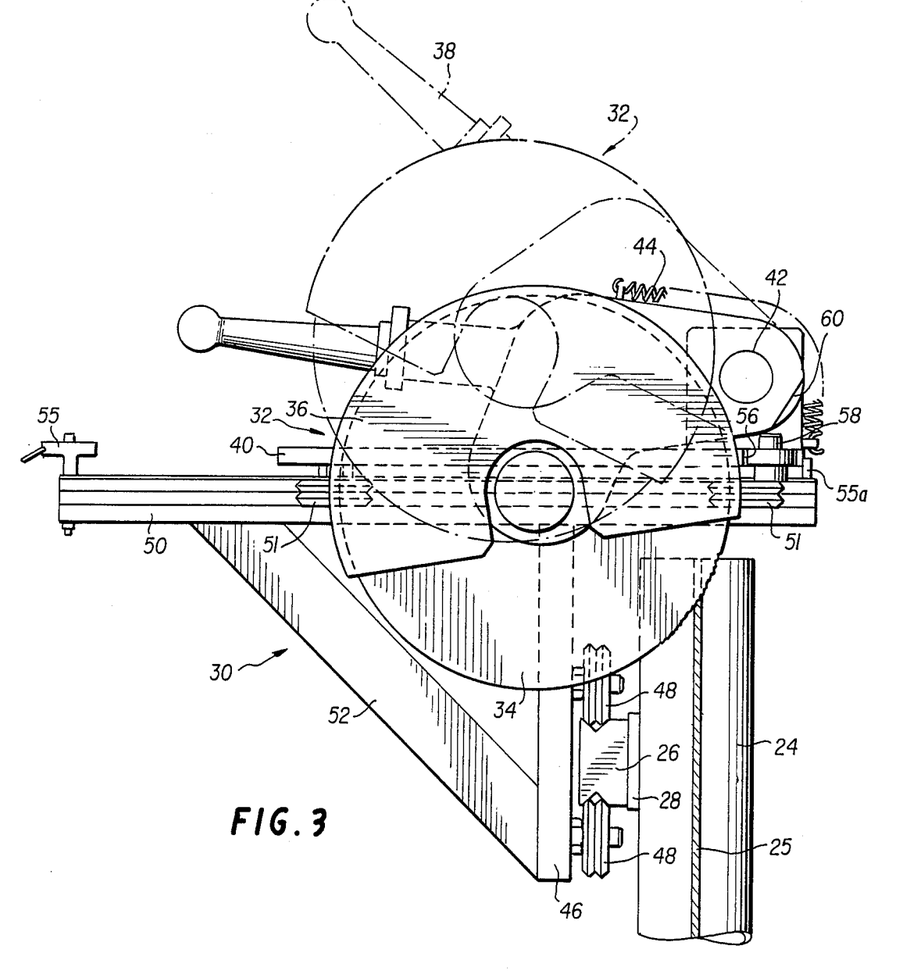
FIG. 3 is a side elevational view of the saw assembly and support system of FIG. 2 but with the saw reversed, with the blade located on the opposite side of its carriage for illustration purposes.
Figure 7:
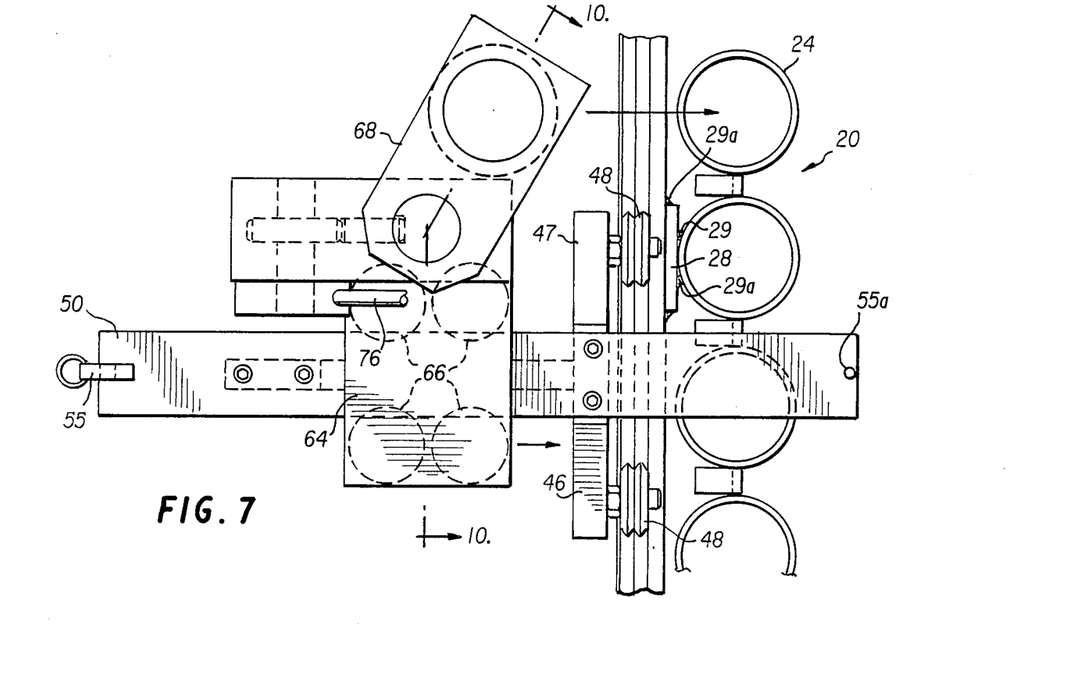
FIG. 7 is a fragmentary top plan view of the apparatus of FIG. 6.
Figure 8:
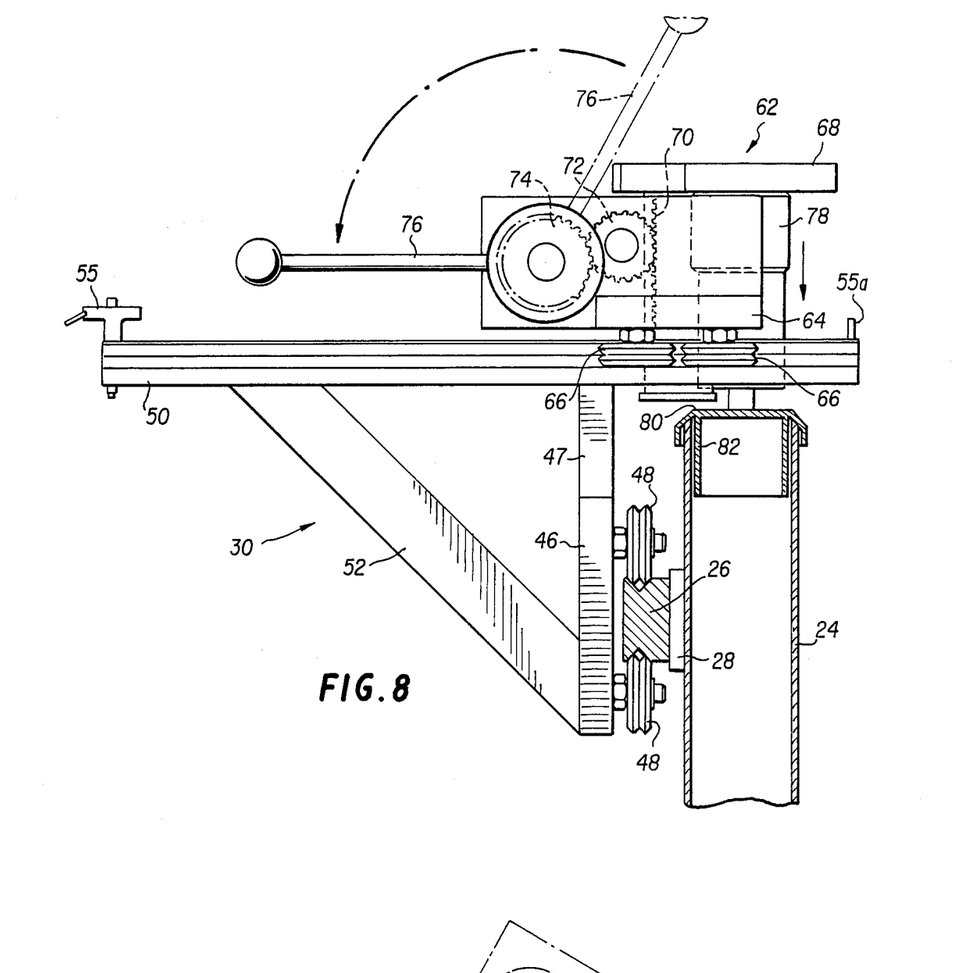
FIG. 8 is a vertical elevational view similar to FIG. 6 but showing the chamfering tool in position over a tube and taken partially in vertical cross section.

Referring now to FIG. 1 of the drawings, there is illustrated a tube wall indicated generally at 20 from which a rectangular section 22 has been removed. Individual pipes are designated 24 with each pipe having a membrane or webbing 25 between the next adjacent pipe. For purposes of this invention, it is immaterial what cutting means is used to remove rectangular panel section 22. However, it is possible to use a guide rail 26 including guide roller receiving profile 26a (the combined guide roller receiving channels or edges along the rail 26) such as is illustrated in FIGS. 2 and 3, for example, in order to establish the necessary spaced horizontal and vertical straight line cuts using a saw mechanism such as is illustrated generally at 32 in FIGS. 2 and 3. This type of guide rail and a preferred cutting saw arrangement are described in the aforementioned patent application U.S. Ser. No. 213,939. An important time saving feature is that once a first guide rail 26 has been temporarily attached to the tube wall 20 with the aid of attaching plate members, one of which is shown at 28 in FIGS. 2 and 3, the first rail may be left in place and combined with the tool support and guide system such as is shown generally at 30 for the membrane cutting and end prepping operation. The attaching plate member 28 is secured by suitable spot welds such as are shown at 29 and 29a in FIG. 7.

The tool support and guide system 30 in accordance with this invention is shown in FIGS. 2 and 3 to have a saw assembly 32 mounted on a second guide rail 50 which is congruent in cross-section with the first guide rail 26 and is orthogonally disposed with respect thereto so as to extend towards and preferably over the cut tube ends in the plane of the panel. Saw assembly 32 includes a saw blade 34, a motor, a protective shield 36, and a handle 38 which is grasped to bring the saw blade into cutting relation with respect to membrane or webbing 25 connecting the tubes. The saw assembly is mounted atop saw carriage member 40 and pivots about shaft 42 to effect its cutting operation. A return spring 44 returns the saw blade assembly to the phantom position illustrated in FIG. 3 which is its rest position. This system is disclosed in the referenced related patent application U.S. Ser. No. 213,939.

The system 30 not only supports guide rail 50 but also includes a support carriage 46 which is positioned generally parallel to the tube wall 20. Carriage 46 is preferably a plate member provided with sloping sides 47, such as is more fully illustrated in FIGS. 6, 7, 8, 10 and 11, so as to permit the saw blade 34 to rotate without obstruction and pairs of guide rollers 48 which engage the first guide rail 26 so as to permit the entire assembly 30 to be positioned at will along the rail 26 in front of the tube wall 20.

Figure 6:
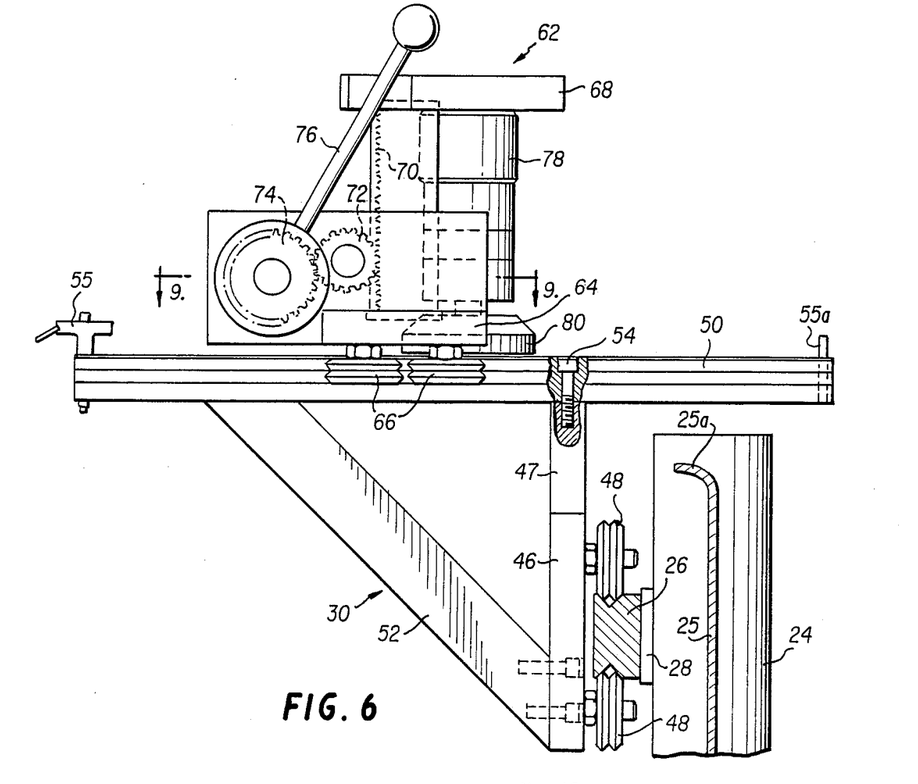
FIG. 6 is a vertical elevational view illustrating the system of the present inveniton with an end preparation tool on its upper guide rail.
Figure 10:
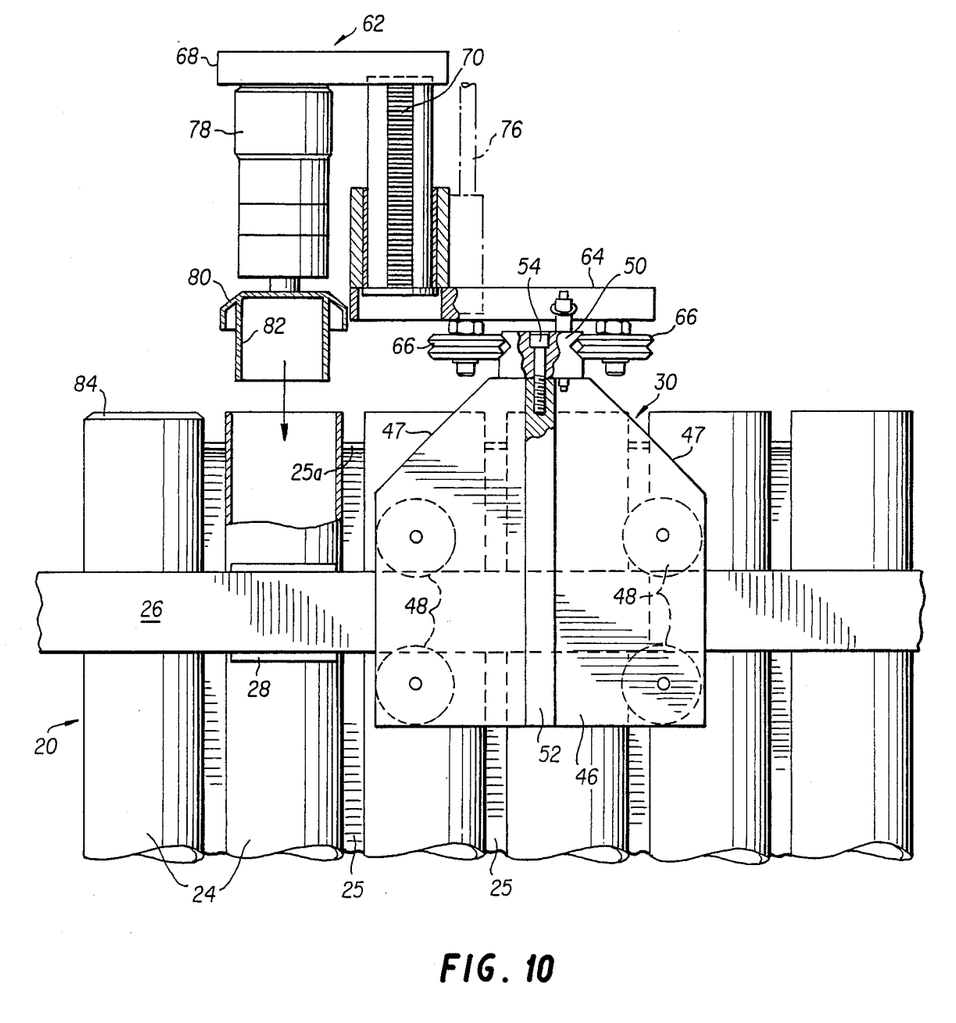
FIG. 10 is an elevational view taken partially in vertical cross section along line 10—10 of FIG. 7.
Figure 11:
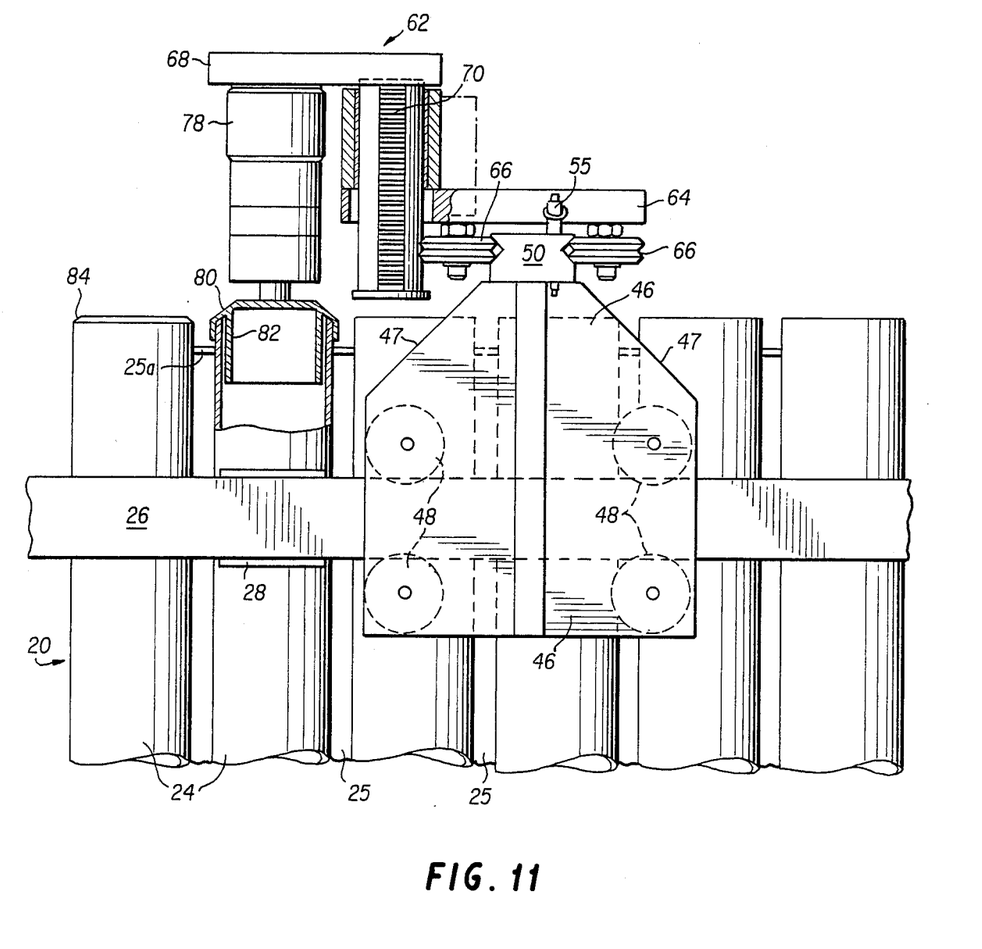
FIG. 11 is an elevational view similar to FIG. 10 but illustrating the chamfering of one of the tubes.

The second guide rail 50 like the first guide rail 26 includes a guide roller receiving profile 50a that is engaged by pairs of rollers 51 carried by saw carriage member 40 in order for the saw assembly supported on the carriage member to move at right angles with respect to the tube wall 20 and the first guide rail 26. A sturdy and rigid construction is provided for the support system 30 with the aid of suitable support or brace means such as is illustrated at 52. Also, as shown in FIGS. 6 and 10, the second guide rail 50 is bolted at 54 to be secured to plate member 46. The saw assembly 32 and its carriage 40 are maintained on the second guide rail 50 with the aid of a removable end stop 55 and a permanent stop 55a. To remove the saw and replace it, for example, with an end preparing beveling or chamfering tool 62, the removable end stop 55 is removed and the saw assembly is slid off the second guide rail 50. End preparation tool assembly 62 is then installed on the guide rail 50 in its place. The removable end stop 55 is then replaced to provide a stop for the chamfering tool.

As illustrated in FIG. 3, the saw assembly 32 is supported by saw carriage member 40 which includes spaced pairs of guide rollers 51 that traverse the second rail 50, which extends generally perpendicular to the plane of the tubes 24. The second rail 50, as previously explained, is supported by carriage plate member 46 that is guided along the first rail 26 by space rollers 48. Preferably, the guide rails 26 and 50 are configured identically so that the saw carriage member 40 and its associated guide rollers 51 can be mounted on either the guide rail 26 or the guide rail 50 interchangeably. When the carriage 40 and the associated saw assembly 32 are mounted on the guide rail 26, the tubes 24 can be cut by a series of plunge cuts along a straight line, in the manner described in the aforementioned related patent application U.S. Ser. No. 213,939.

As described in the related patent application, it is to be noted that the saw assembly 32 includes a brake system including a brake plunger 58 disposed so as to extend through aperture 56 in carriage 40 and actuated by cam 60 for locking the carriage 40 relative to the rail 50 when the saw 32 is pivoted around shaft (axis) 42 to perform a cut. Actually, it is also to be noted that the saw blade 34 in reality will generally be constituted of an abrasive cut off disc, as is well-known in the pertinent technology. Accordingly, the saw assembly 32 as illustrated in FIG. 3 can be advanced to the membrane 25 and lowered against the membrane for cutting a selected depth into the membrane as illustrated in FIGS. 4 and 5.

Figure 4:
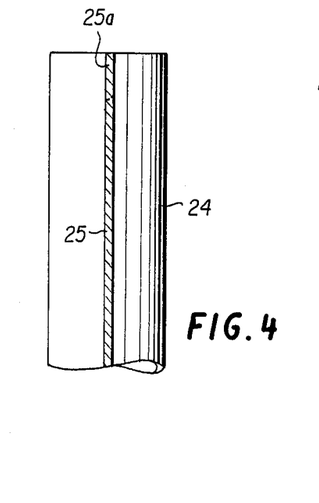
FIG. 4 is a fragmentary elevational view of a single pipe taken in vertical cross section through its webbing after the webbing has been cut.
Figure 5:
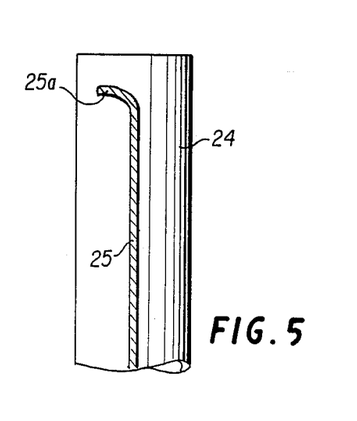
FIG. 5 is a fragmentary elevational view similar to FIG. 4 with the cut portion of the webbing bent forward.

FIGS. 4 and 5 illustrate the nature of the cut which is performed by the saw assembly 32. Specifically, the membrane or webbing 25 adjacent each pipe is cut whereby an end portion 25a may be bent out of the plane of the membrane or webbing 25 with the aid of a suitable tool to the position illustrated in FIG. 5. End 25a may later be trimmed and then bent back into the plane of the membrane or webbing 25 and welded, for example, during the welding of the replacement tube panel section.

Figure 9:
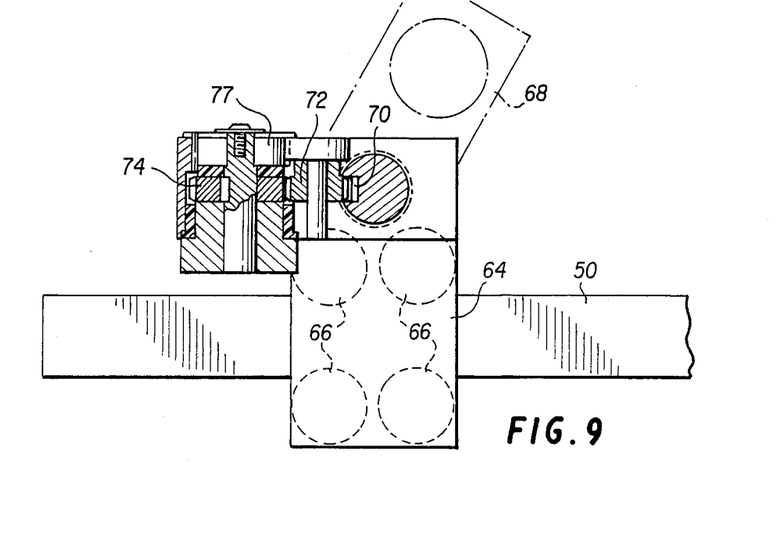
FIG. 9 is a fragmentary plan view taken in horizontal cross section along line 9—9 of FIG. 6.

An end prep tool, for example, a chamfering or beveling tool, is indicated generally at 62 in FIGS. 6-8, 10 and 11. Tool 62 includes a lower end prep tool support carriage 64 which carries spaced pairs of rollers 66 for engagement with the second guide rail 50. An upper plate is shown at 68 on which is mounted a rack gear 70 having a pinion gear 72 in engagement therewith and an actuating gear 74 on the same axis as that for handle 76. The assembly also includes a spring return 77 (see FIG. 9) for returning handle 76 from the full line position in FIG. 8 to the phantom position in that figure. A motor drive 78 (which may be electrical or fluid energized) is also secured to the underside of upper plate 68 to provide the rotational drive for cutting tool 80 which is located at the end of the motor's drive shaft. A mandrel pilot or centering means 82 depends from the cutting tool 80 as is seen best in FIGS. 8, 10 and 11. It is to be noted that the spaced pairs of rollers 66 (see FIG. 7) are configured to cooperate with rail 50 in the same manner as rollers 51 associated with the saw assembly 32.

In preparation for machining a tube in the tube wall 20, the support and guide system 30 is slid manually in a direction parallel to the tube wall on rail 26 until the end prep cutting tool is substantially in line with the tube to be machined. The end preparation tool is then slid manually along rail guide 50 into position directly over the tube to be machined. Handle 76 is pulled from the phantom position toward the full line position in FIG. 8 whereby the mandrel pilot or centering means 82 enters the tube to be prepared and the rotation of cutting tool 80 by motor drive 78 machines (i.e., bevels) the tube in the manner illustrated at 84 in FIGS. 10 and 11 to prepare the tube for welding to a replacement section tube.

The operation of the system will be understood by listing the principal method steps employed for effecting replacement of a removed panel section from a tube wall, which are as follows:

a. attaching a first guide rail adjacent each line to be cut through a tube panel;

b. removing a rectangular section from a tube wall by making a pair of spaced upper and lower cut lines through the walls of selected tubes in a tube wall and interconnecting vertical cut lines through the membrane or webbing adjacent the selected end pipes of the rectangular section using a saw guided along the guide rail, c. attaching the tool support and guide system described hereinabove to the first guide rail that is attached to the tube panel a predetermined distance below the lower horizontal cut line, d. roller mounting a saw assembly on a second guide rail member extending perpendicular to the first rail towards the cut tube ends and cutting through the webbing between the pipes of the tube wall which border on the lower horizontal cut line using the saw assembly, e. bending the cut webbing away from the cut tube ends, f. removing the saw assembly from the second guide rail member, g. roller mounting a tube chamfering tool assembly on the second guide rail member and chamfering the end of the tubes bordering on the lower horizontal cut line, h. removing the support and guide system from the tube wall and re-attaching the adapter at a predetermined distance above the upper horizontal cut line and repeating steps (c), (d), (e) and (f) with respect to the upper horizontal cut line, i. inserting a replacement section in the tube wall to replace the removed rectangular section with the tube portions thereof having prepared ends corresponding to the chamfered ends of the tubes bordering on the removed section, and j. welding the replacement section in place including repositioning and welding the membranes.

There are a number of inherent advantages which accrue to the use of the present invention. For example, by utilizing a brake means on the saw, it is encumbent upon the operator to employ the desirable plunge cut motion in order to bring the saw (i.e., cut off abrasive disk) into operation. Also by reversing the position of the saw assembly 32 on rail 50, it becomes possible to cut through all of the membranes or webbing material between the pipes bordering on the removed section without experiencing interference resulting from the width of the plate itself, since the blade can be positioned on opposite sides of the rail 50. The preparation (i.e., beveling) of the tubes bordering the upper cut line is effected by re-attaching the support and guide system a predetermined distance above the upper cut line in inverted position with the saw assembly and then the end prep tool assembly located thereon.

Moreover, the pair of guide rails having similar guide receiving surfaces enables the use of a single panel saw assembly to both cut the tubes and the connecting webbing.

While a preferred embodiment of the invention has been shown and described herein, it should be understood that the invention is not intended to be limited thereby, but may be embodied and practiced by any means within the scope of the appended claims.

What is claimed is:

1. A tool support and guide system for end preparation of cut ends of tubes extending along a straight line and connected together by membranes to form a tube panel, said panel having secured thereto a first guide rail means extending parallel to and adjacent the line of cut tube ends to be prepared, said first guide rail means including a guide roller receiving profile for receiving guide rollers in cooperating relationship comprising:
    a first support carriage means including a first guide roller assembly mounted for movement along the first guide rail means with the first guide roller assembly engaging the guide roller receiving profile of the first guide rail in cooperating relationship;
    a second guide rail means carried by said first support carriage means and extending normal to said first guide rail means in a direction towards and generally perpendicular to the cut panel tubes;
    said second guide rail means including a guide roller receiving profile conforming in configuration with the guide roller receiving profile of said first guide rail means.

2. The tool support and guide system as claimed in claim 1 including a saw assembly support carriage means including a second guide roller assembly engaging the second guide rail means in cooperative relationship for enabling the saw assembly support carriage means to move along the second guide rail means towards and away from the cut panel tube ends; and a saw assembly including a saw tool supported by the saw assembly support carriage means, the saw assembly mounted on saw assembly supporting carriage means for pivotal movement in a plane extending normal to and parallel with the second guide rail means, whereby the saw tool can be advanced towards the panel tube membranes for cutting same.

3. The tool support and guide assembly as claimed in claim 2, said saw assembly including a drive motor, a manual actuating lever for effecting pivotal movement of the saw assembly, and a brake means engageable to prevent relative movement between the saw assembly support carriage means and the second guide rail means when the saw assembly is pivoted to advance the saw tool towards a membrane to be cut.

4. The tool support and guide system as claimed in claim 3 including automatic brake engaging means for automatically engaging the brake means when the saw assembly is pivoted to cut a membrane.

5. The tool support and guide system as claimed in claim 1 including an end prep tool support carriage means including a second guide roller assembly engaging the second guide rail means in cooperative relationship for enabling the end prep tool support carriage means to move along the second guide rail means towards and away from the cut panel tube ends; and an end prep tool assembly including an end prep cutting tool supported by the end prep support carriage means, the end prep cutting tool mounted so as to be movable towards and away from the cut panel tube ends to machine the latter in preparation for welding to mating tube ends.

6. The tool support and guide systems as claimed in claim 5, said end prep tool assembly including a manually actuatable rack and pinion feed system for advancing the end prep cutting tool towards the cut panel tube ends.

7. A process for preparing the ends of a panel of tubes connected by membranes and cut along a straight line for welding thereto of a mating assembly of a panel of tubes and connecting membranes comprising:
    mounting a first guide rail on the panel of cut tubes adjacent the tube ends and extending parallel to the cut lines;
    mounting a first tool support carriage on the first rail using guide rollers engaging a guide roller profile on the first rail so that the first carriage can freely roll along the first rail parallel to the cut tube ends;
    mounting a second guide rail on the first carriage so that the second rail extends perpendicular to the first rail and perpendicular to the tube panel, the second rail being provided with a guide roller receiving profile corresponding to the guide roller receiving profile of the first rail;
    mounting a saw supporting carriage including guide rollers on the second rail for movement therealong, with the guide rollers engaging the guide roller receiving profile of the second rail in cooperative relationship;
    mounting a saw assembly including a saw tool on the saw support carriage in a manner such that the saw tool is movable towards and away from a membrane connecting a pair of panel tubes after the saw tool is aligned with such membrane;
    cutting and manipulating the membranes between panel tubes sequentially to expose the tube ends to receive an end preparation tool;
    removing the saw assembly support carriage and the saw assembly from the second rail;
    mounting an end preparation tool support carriage including guide rollers on the second rail for movement therealong with the respective guide rollers engaging the guide roller receiving profile of the second rail cooperating relationship;
    mounting an end preparation tool including an end preparing cutter tool on the end preparation tool support carriage in such a manner that the end preparation cutting tool is movable towards and away from a tube end to be prepared for welding after the end preparation tool is aligned with such tube end;
    machining the cut tube ends sequential to prepare them for welding to mating tube ends by sequentially aligning the end preparation tool with each tube end by manipulating the first tool support carriage along the first guide rail and the end preparation tool support carriage along the second guide rail until each desired alignment is achieved.

8. The process as claimed in claim 7 wherein the cut panel tubes are aligned in a single plane, and a second guide rail intersects the plane of the cut panel tubes, including cutting the membranes by plunging movement of the saw tool in a direction generally parallel to the axial lengths of panel tubes.

9. The process as claimed in claim 8 including braking the saw assembly relative to the second guide rail during each membrane cutting procedure.

* * * * *